(12) United States Patent
Hamada

(10) Patent No.: US 8,488,899 B2
(45) Date of Patent: Jul. 16, 2013

(54) IMAGE PROCESSING APPARATUS, METHOD AND RECORDING MEDIUM

(75) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 209 days.

(21) Appl. No.: 13/175,360

(22) Filed: Jul. 1, 2011

(65) Prior Publication Data

US 2012/0002897 A1    Jan. 5, 2012

(30) Foreign Application Priority Data

Jul. 5, 2010    (JP) ................................. 2010-153485

(51) Int. Cl.
*G06K 9/40* (2006.01)

(52) U.S. Cl.
USPC ........................................................ 382/260

(58) Field of Classification Search
USPC .............. 341/105; 345/692; 348/573, E7.022; 382/237, 260, 276
See application file for complete search history.

(56) References Cited

U.S. PATENT DOCUMENTS

| | | | |
|---|---|---|---|
| 6,917,692 B1 * | 7/2005 | Murching et al. | 382/103 |
| 7,418,150 B2 * | 8/2008 | Myoga | 382/260 |
| 7,733,379 B2 | 6/2010 | Hosoda | |
| 7,893,968 B2 | 2/2011 | Hosoda | |
| 2004/0091049 A1 * | 5/2004 | Yamaguchi et al. | 375/240.16 |

FOREIGN PATENT DOCUMENTS

| | | |
|---|---|---|
| JP | 11-331693 A | 11/1999 |
| JP | 2000-201298 A | 7/2000 |
| JP | 2005-006191 A | 1/2005 |
| JP | 2005-229198 A | 8/2005 |

OTHER PUBLICATIONS

Japanese Office Action dated Feb. 7, 2012, issued in counterpart Japanese Application No. 2010-153485, and English translation thereof.

* cited by examiner

*Primary Examiner* — Gregory F Cunningham
(74) *Attorney, Agent, or Firm* — Holtz, Holtz, Goodman & Chick PC

(57) ABSTRACT

A filter coefficient calculating unit 81 sets as a filter window a range, which contains plural coordinates including an attention coordinate "p" in an initial alpha map, and uses a pixel value Ip at a coordinate of an original image corresponding to a coordinate "p" in the filter window and a pixel value Iq at a coordinate of the original image corresponding to a coordinate "q" in the filter window to calculate a filter coefficient Kq at the coordinate "q" on a coordinate to coordinate basis in the filter window. That is, a filter coefficient set is created, which consists of filter coefficients calculated on a coordinate to coordinate basis in the filter window. A weighted-average filtering unit 83 uses the filter coefficient set to apply a weighted-average filtering operation on each pixel value in the filter window.

8 Claims, 13 Drawing Sheets

FIG.10A
FIG.10B
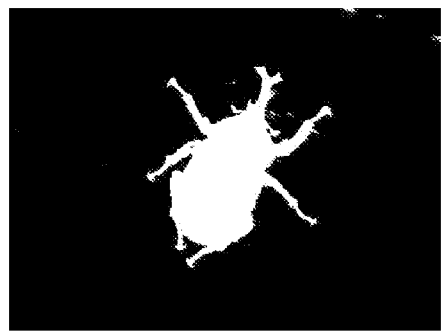
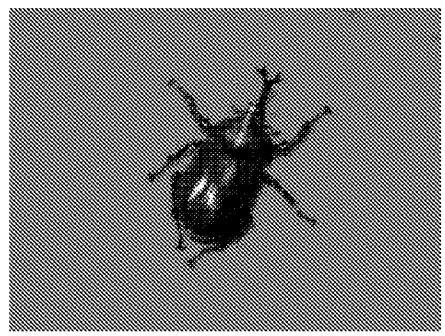
FIG.10C

IMAGE PROCESSING APPARATUS, METHOD AND RECORDING MEDIUM

CROSS-REFERENCE TO RELATED APPLICATIONS

The present application is based upon and claims the benefit of priority from the prior Japanese Patent Application No. 2010-153485, file Jul. 5, 2010, and the entire contents of which are incorporated herein by reference.

BACKGROUND OF THE INVENTION

1. Field of the Invention

The present invention relates to a technique, which uses data of an original image and data of a two-valued original image to crop a subject from the original image, and combines the cropped subject onto other image.

2. Description of the Related Art

Conventional technique is known, which uses data of an original image as data of an image including a subject to extract or crop the subject out of the original image, and combine the subject with another images. This technique is called "Dynamic Photo" (Registered Trademark).

In Dynamic Photo, when a region containing the subject is detected as an "attention region" from the original image, data of an image of two value labels is created, which contains the attention region and other region, wherein the attention region is white in color and other region is black in color. Hereinafter, the data composed of white pixels having a value "0" and black pixels having a value "1" is referred to as "data of an alpha map" or "alpha map data", and each of the pixel values composing the alpha map is referred to as an "alpha value".

In Dynamic Photo, data of an alpha map is used to determine the region of the subject and to extract or crop the region of the subject (hereinafter, referred to as an "extracted region") out of the original image, and the extracted region is inserted into a separate image, whereby a composite image is created.

But if the alpha map data is used without any modification made thereto, background components of the original image can be mixed in or a lack of subject component can appear at the edge of extracted region in the resultant composite image. When such extracted region is combined with other image, such a composite image is created as containing the awkwardly cropped and pasted subject and being unnatural and less a reality.

As a conventional method used for the purpose of lightening up the above defects in the composite image, a method has been proposed, which applies an average filter on the alpha map data. The average filter means Gaussian Filter and/or a simple low pass filter similar to Gaussian Filter.

But even if this conventional method has been simply applied on the alpha map data, the edge of the subject can blur in the composite image. As a result, the resultant composite image is unnatural and less of a reality.

Further, as another method of lightening up the defects in the unnatural composite image created when the alpha map data is used as-is, a so-called "matching" method has been proposed. That is, when the alpha map data is used as-is, the resultant composite image can be made unnatural and less of a reality. This is because of pixels belonging to a boundary and/or a subject, which are judged in error due to detection error made when the attention region is detected, and further because of mixed-up pixels included in an edge. The mixed-up pixels mean those having color of a background and color of the subject in the mix.

The matching method is a method of finely resolving the edge to separate regions and pixel values of the mixed-up pixels into a background component and a subject component.

But when the matching method is executed, following difficulties (first and second problem) are invited.

The first problem resides in more calculation load, more work memory, and a large scale of circuitry required to execute the matching method.

The second problem resides in difficulty of obtaining a beautiful composite image without a precise tri-map. The tri-map is a subsidiary three-valued data, in which either of three labels such as a subject, background and suspended intermediate region is assigned to each pixel coordinate. In general, assignment of three value labels in the tri-map is made by human work. Although it is not impossible to assign three value labels automatically, it is still hard to complete a precise tri-map.

Therefore, it is desired to provide a technique, which uses data of an original image and data of an alpha map to extract a subject from the original image and combines the extracted subject with other image, thereby creating a composite image that seems more natural and real. At present, the technique, which meets the above requirements satisfactorily is not available.

SUMMARY OF THE INVENTION

According to one aspect of the invention, there is provided an image processing apparatus, which comprises a data processing unit for processing data consisting of pixel values at coordinates in an original image to create data consisting of resultant pixel values at coordinates as data of a processed image, and a filtering unit for setting each of the coordinates in the processed image of the data created by the data processing unit as an attention coordinate to be processed, and defining as a filter window a region containing plural coordinates including the attention coordinate, and for performing a weighted-average filtering operation on data of the filter window, thereby converting the pixel value at the attention coordinate, wherein the filtering unit comprises a filter coefficient calculating unit for using a first pixel value at a first coordinate in the original image, which first coordinate corresponds to the attention coordinate in the filter window, and a second pixel value at a second coordinate in the original image, which second coordinate corresponds to a certain coordinate in the filter window to calculate a filter coefficient at the certain coordinate on a coordinate to coordinate basis in the filter window, and a weighted-average filtering unit for using the filter coefficient of each coordinate in the filter window to apply the weighted-average filtering operation on data of the filter window.

According to another aspect of the invention, there is provided an image processing method in an image processing apparatus for processing data of an original image, which method comprises a processing step of processing data consisting of pixel values at coordinates in the original image to create data consisting of resultant pixel values at coordinates as data of a processed image, and a filtering step of setting each of the coordinates in the processed image of the data created at the processing step as an attention coordinate to be processed, and of defining as a filter window a region containing plural coordinates including the attention coordinate, and of performing a weighted-average filtering operation on data of the filter window, thereby converting the pixel value at the attention coordinate, wherein the filtering step comprises a filter coefficient calculating step of using a first pixel value at a first coordinate in the original image, which first coordinate corresponds to the attention coordinate in the filter window, and a second pixel value at a second coordinate in the original image, which second coordinate corresponds to a certain coordinate in the filter window to calculate a filter coefficient at the certain coordinate on a coordinate to coordinate basis in the filter window, and a weighted-average filtering step of using the filter coefficient of each coordinate in the filter window to apply the weighted-average filtering operation on data of the filter window.

According to still another aspect of the invention, there is provided a computer readable recording medium to be mounted on an image processing apparatus for processing data of an original image, wherein the image processing apparatus is provided with a computer for controlling operation of the same apparatus, the recording medium storing a program, when executed by the computer, to make the computer perform functions, which comprises a data processing function of processing data consisting of pixel values at coordinates in an original image to create data consisting of resultant pixel values at coordinates as data of a processed image, and a filtering function of setting each of the coordinates in the processed image of the data created by the data processing function as an attention coordinate to be processed, and defining as a filter window a region containing plural coordinates including the attention coordinate, and of performing a weighted-average filtering operation on data of the filter window, thereby converting the pixel value at the attention coordinate, wherein the filtering function comprises a filter coefficient calculating function of using a first pixel value at a first coordinate in the original image, which first coordinate corresponds to the attention coordinate in the filter window, and a second pixel value at a second coordinate in the original image, which second coordinate corresponds to a certain coordinate in the filter window to calculate a filter coefficient at the certain coordinate on a coordinate to coordinate basis in the filter window, and a weighted-average filtering function of using the filter coefficient of each coordinate in the filter window to apply the weighted-average filtering operation on data of the filter window.

BRIEF DESCRIPTION OF THE DRAWINGS

The above and other objects, features, and advantages of the invention will become more apparent from the following detailed description taken in conjunction with the accompanying drawings.

FIG. 4A is a view showing an example of data of an original image used in the combining process performed in the present embodiment of the invention.

FIG. 4B is a view showing an example of data of an image with a subject removed, that is, an example of data of a background image of the original image used in the combining process performed in the present embodiment of the invention, wherein the subject is a foreground subject of the composite image.

FIG. 4C is a view showing an example of data of a composite background image used in the combining process performed in the present embodiment of the invention.

FIG. 4D is a view showing an example of data of an initial alpha map used in the combining process performed in the present embodiment of the invention.

FIG. 8A is a view showing an example of data of the initial alpha map created from data of the original image.

FIG. 8B is a view showing an example of data of a composite foreground image created from data of the initial alpha map.

FIG. 8C is a view showing an example of data of a composite image obtained by combining data of the composite foreground image shown in FIG. 8B and data of the composite background image shown in FIG. 4C.

FIG. 9A is a view showing an example of data of a resultant alpha map obtained when the conventional average filtering operation is performed on data of the initial alpha map shown in FIG. 8A.

FIG. 9B is a view showing an example of data of a composite foreground image created from data of the alpha map shown in FIG. 9A.

FIG. 9C is a view showing an example of data of a composite image obtained by combining data of the composite foreground image shown in FIG. 9B and data of the composite background image shown in FIG. 4C.

FIG. 10A to FIG. 10C are views showing examples of data of resultant composite images in the case of usage of the filtered alpha map data obtained after the adaptive filtering process is performed by the adaptive filtering unit in accordance with a formula (3).

FIG. 10A is a view showing an example of data of a resultant filtered alpha map obtained when the adaptive filtering process is performed on the data of an initial alpha map shown in FIG. 8A.

FIG. 10B is a view showing an example of data of a composite foreground image created from the data of a filtered alpha map shown in FIG. 10A.

FIG. 10C is a view showing an example of data of a composite image obtained by combining data of the composite foreground image shown in FIG. 10B and data of the composite background image 102 shown in FIG. 4C.

FIG. 11A is a view showing an example of data of a resultant filtered alpha map obtained after the adaptive filtering process is performed on the data of an initial alpha map shown in FIG. 8A.

FIG. 11B is a view showing an example of data of a composite foreground image created from data of the filtered alpha map shown in FIG. 11A.

FIG. 11C is a view showing an example of data of a composite image obtained by combining data of the composite foreground image shown in FIG. 11B and data of the composite background image shown in FIG. 4C.

FIG. 12A is a view showing an example of data of an alpha map obtained after the conventional average filtering operation is applied on data of the initial alpha map having the original size, which is obtained by scaling up the initial alpha map of a decreased-size, wherein the initial alpha map of a decreased-size is obtained by reducing the original image in size (shown in FIG. 8A to FIG. 8C).

FIG. 12B is a view showing an example of data of a composite foreground image created from the alpha map data shown in FIG. 12A.

FIG. 12C is a view showing an example of data of a composite image obtained by combining data of the composite foreground image shown in FIG. 12B and data of the composite background image shown in FIG. 4C.

FIG. 13A is a view showing an example of data of a filtered alpha map obtained after the adaptive filtering process is performed in accordance with the above formula (10) on the data of an alpha map having the original size, which is obtained by scaling up the initial alpha map of a decreased-size, wherein the initial alpha map of a decreased-size is obtained by reducing the original image in size (shown in FIG. 8A to FIG. 8C).

FIG. 13B is a view showing an example of data of a composite foreground image created from the filtered alpha map data shown in FIG. 13A.

FIG. 13C is a view showing an example of data of a composite image obtained by combining data of the composite foreground image shown in FIG. 12B and data of the composite background image shown in FIG. 4C.

DETAILED DESCRIPTION OF THE PREFERRED EMBODIMENTS

Now, embodiments of the present invention will be described with reference to the accompanying drawings in detail.

Figure 1:
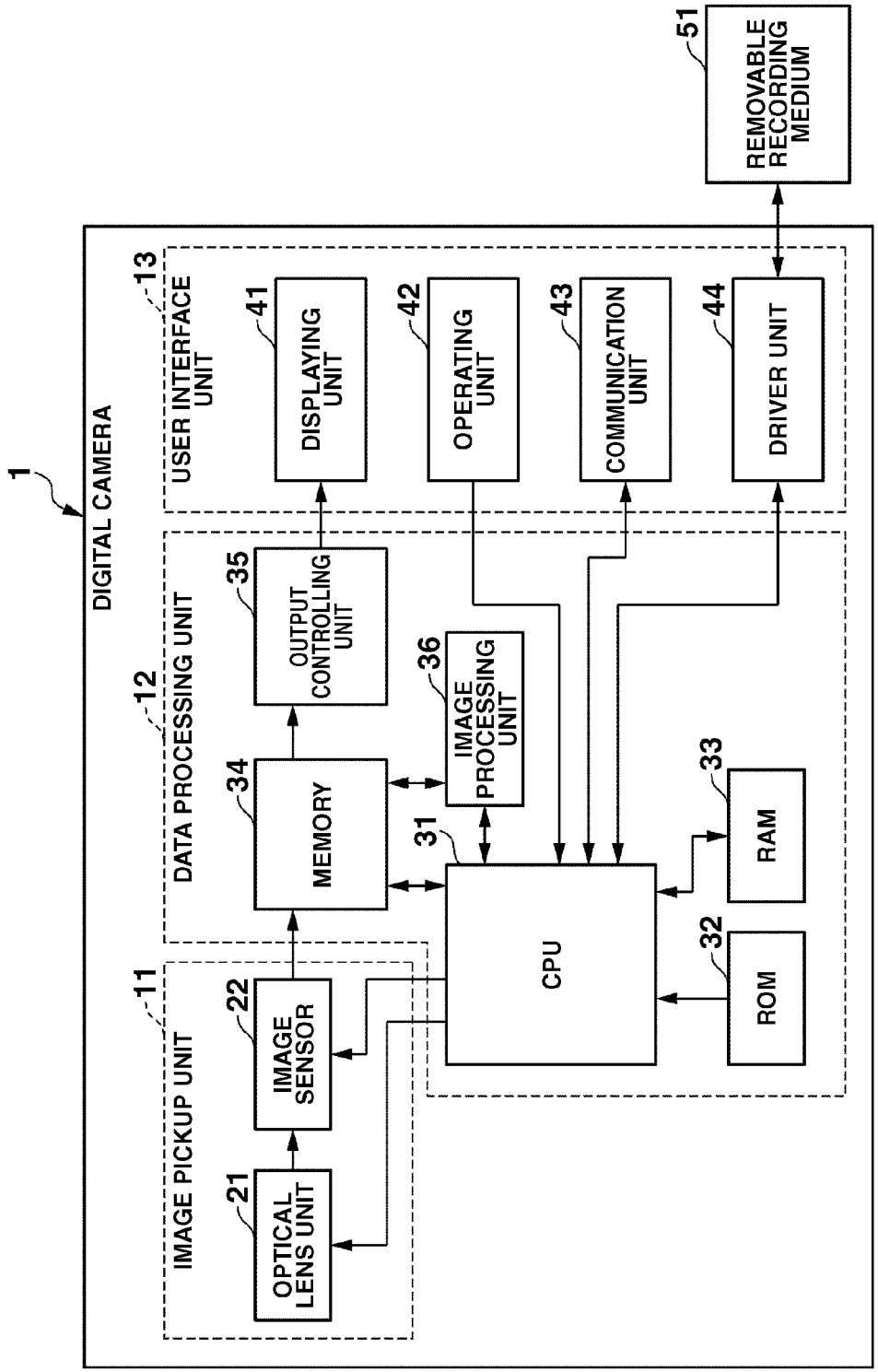
FIG. 1 is a block diagram showing a configuration of hardware of a digital camera, which serves as an image processing apparatus according to the present embodiment of the invention.

FIG. 1 is a block diagram showing a configuration of hardware of a digital camera 1, which serves as an image processing apparatus according to the embodiment of the invention.

The digital camera 1 comprises an image pickup unit 11, a data processing unit 12, and a user interface unit 13.

As shown in FIG. 1, the image pickup unit 11 has an optical lens unit 21 and an image sensor 22.

The optical lens unit 21 consists of collecting lenses such as a focus lens and a zoom lens, for taking a picture of a subject within a defined field angle (hereinafter, referred to as a "formal field angle"). The focus lens serves to form an image of a subject on a light-receiving plane of the image sensor 22. The zoom lens serves to vary a focal length within a certain range.

The optical lens unit 21 is provided with a peripheral circuit, which adjusts setting parameters with respect to a focal point, exposure, and white balance, when needed.

The image sensor 22 consists of a photoelectric conversion element and AFE (Analog Front End). For instance, the photoelectric conversion element consists of CMOS (Complementary Metal Oxide Semiconductor). The photoelectric conversion element receives an incident subject image from the optical lens unit 21 through a shutter mechanism (not shown). The photoelectric conversion element executes photoelectric conversion of the subject image every certain period of time thereby accumulating an image signal, and successively supplies the accumulated image signals as an analog signal to AFE.

AFE performs various sorts of processes (including Analog/Digital conversion) on the analog image signal. The analog image signal is subjected to the various sorts of processes and converted into a digital signal. The resultant digital signal is output from the image sensor 22. Hereinafter, the digital signal (image signal) is referred to as "image data".

As shown in FIG. 1, the data processing unit 12 comprises CPU (Central Processing Unit) 31, ROM (Read Only Memory) 32, RAM (Random Access Memory) 33, a memory 34, an output controlling unit 35, and an image processing unit 36.

CPU 31 runs a program stored in ROM 32 to execute various sorts of processes. RAM 33 stores data necessary for CPU 31 to perform the various sorts of processes.

In the present embodiment, in ROM 32 are stored a program for realizing respective functions of an image obtaining unit 61 and a composition processing unit 63 (both to be described later) shown in FIG. 2. CPU 31 runs the program to realize the respective functions of the image obtaining unit 61 and the composition processing unit 63.

The memory 34 consists of DRAM (Dynamic Random Access Memory), and temporarily stores image data output from the image sensor 22. In the present embodiment, an image recording unit 62 (to be described later) shown in FIG. 2 is prepared in an area of the memory 34. Various sorts of image data to be described later will be stored in the image recording unit 62. In the memory 34 are stored various sorts of data required for performing the various sorts of image processes, including image data, values of various graphs and data of threshold values. Further, the memory 34 has a display-memory area used for storing image data to be displayed (hereinafter, referred to as "display-image data" or "image data to be displayed").

The output controlling unit 35 reads display-image data from the display-memory area of the memory 34, and displays an image (hereinafter, referred to as "display-image") represented by the display-image data on a displaying unit 41 of the user interface unit 13.

The image processing unit 36 consists of DSP (Digital Signal Processor), and performs various sorts of image processes on image data stored in the memory 34, including White Balance and Gamma Correction.

Figure 2:
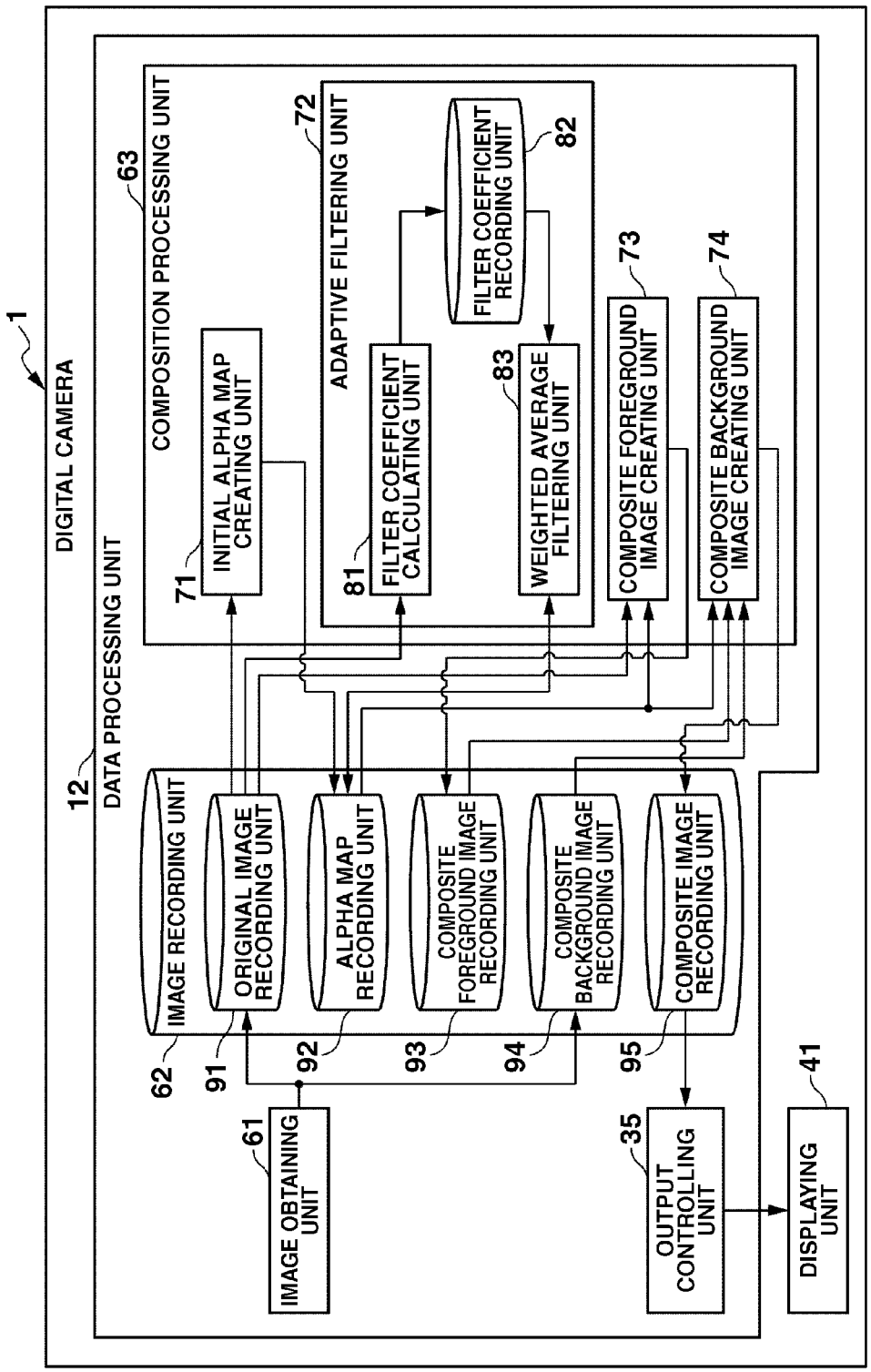
FIG. 2 is a block diagram showing functions of a data processing unit in the digital camera shown in FIG. 1.

In the present embodiment, the image processing unit 36 performs at least some of the image processes to be performed by the image obtaining unit 61 and the composition processing unit 63 shown in FIG. 2, and CPU 31 performs some of the remaining image processes. In other words, in the present embodiment, a combination of hardware and software constitutes the image obtaining unit 61 and the composition processing unit 63 shown in FIG. 2, wherein the hardware consists of CPU 31 and the image processing unit 36 and the software consists of a program stored in ROM 32.

The user interface unit 13 comprises the displaying unit 41, an operating unit 42, a communication unit 43, and a driver unit 44, wherein the displaying unit 41 has a liquid crystal display device, the operating unit 42 receives an instructing operation by a user, the communication unit 43 controls communication with an external device, and the driver unit 44 serves to write data onto a removable recording medium and/or read data from the removable recording medium.

The digital camera 1 having the configuration described above has the above described Dynamic Photo function. In other words, the digital camera 1 combines data of an image (hereinafter, a "composite foreground image") containing a subject as a foreground object, which subject is cropped out of an original image with data of an image (hereinafter, a "composite background image") to be used as a background image, onto which the foreground subject is to be pasted, thereby creating data of a composite image. Hereinafter, a series of processes described above are called a "combining process".

FIG. 2 is a block diagram showing functions of the data processing unit 12 for performing the "combining process".

The data processing unit 12 comprises the image obtaining unit 61, the image recording unit 62, and the composition processing unit 63.

The image obtaining unit 61 obtains data of an original image used as a composite foreground image, and/or data of a composite background image, and stores the data in the image recording unit 62.

The image recording unit 62 comprises an original image recording unit 91, an alpha map recording unit 92, a composite foreground image recording unit 93, a composite background image recording unit 94, and a composite image recording unit 95. The contents to be recorded in the respective units of the image recording unit 62 will be specifically described in the course of description of the combining process with reference to a flow chart of FIG. 3.

The composition processing unit 63 performs a main process of the combining process, that is, the composition processing unit 63 performs a series of processes, in which data of a composite foreground image is created from the original image data and data of a composite foreground image and data of a composite background image are combined together, whereby composite image data is created.

To perform the series of processes described above, the composition processing unit 63 is provided with an initial alpha map creating unit 71, an adaptive filtering unit 72, a composite foreground image creating unit 73, and a composite background image creating unit 74.

The adaptive filtering unit 72 comprises a filter coefficient calculating unit 81, a filter coefficient recording unit 82, and a weighted-average filtering unit 83.

Figure 3:
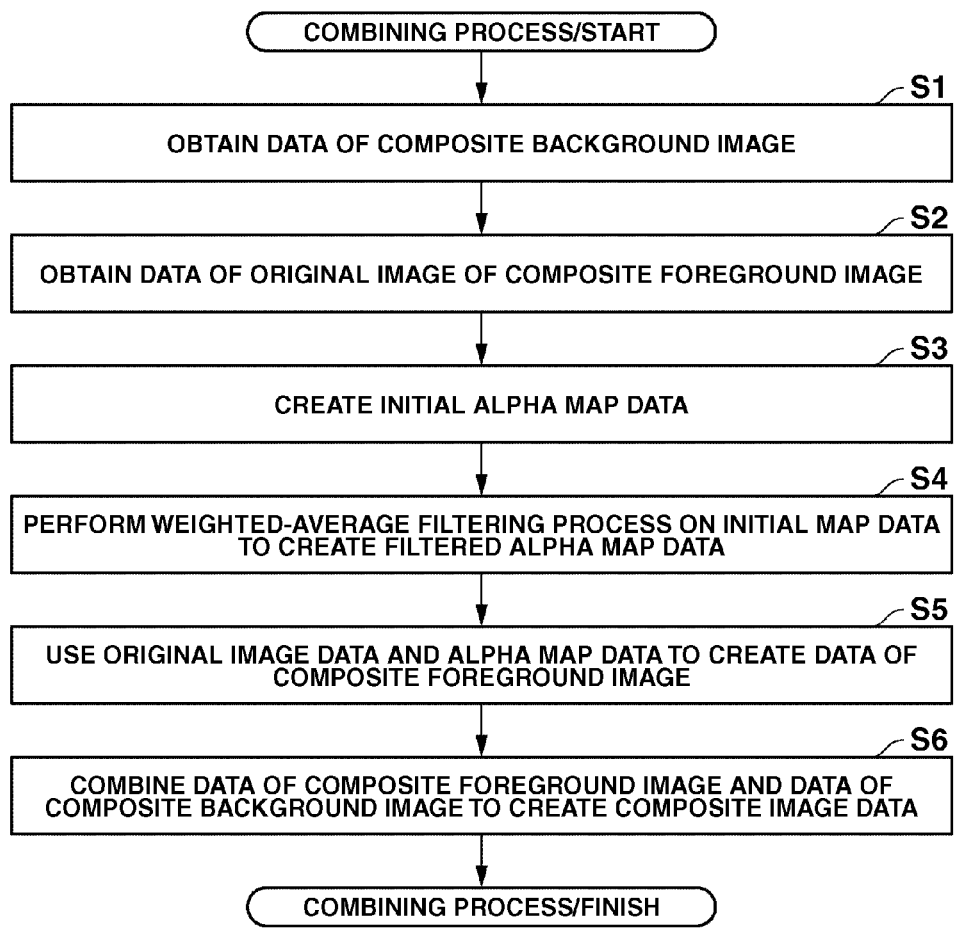
FIG. 3 is a flow chart of an example of a combining process performed by the data processing unit shown in FIG. 2.

The function of each unit in the composition processing unit 63 will be specifically described in the course of description of the combining process with reference to a flow chart of FIG. 3.

FIG. 3 is a flow chart of an example of the combining process performed by the data processing unit 12 having the functions shown in FIG. 2.

Figure 4A:
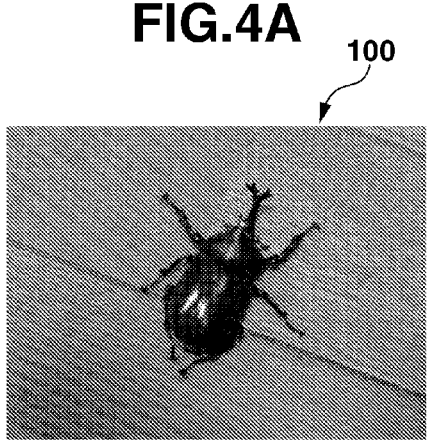
FIG. 4A to FIG. 4D are views showing examples of image data used in the combining process performed in the present embodiment of the invention.
Figure 4B:
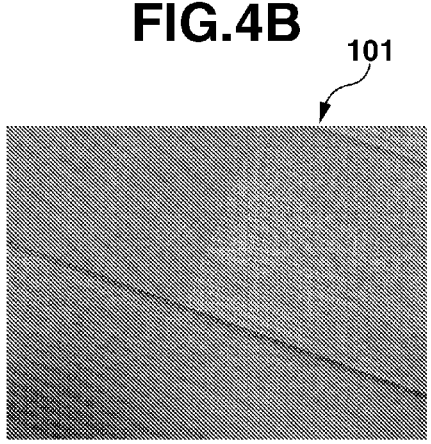

The image obtaining unit 61 obtains and stores data of a composite background image in the composite background image recording unit 94 (step S1). For example, data of a composite background image 102 to be described later, as shown in FIG. 4C will be obtained and stored in the composite background image recording unit 94.

The image obtaining unit 61 obtains data to be used as the original image of a composite foreground image and stores the data in the original image recording unit 91 (step S2). For example, data of an original image 100 to be described later, as shown in FIG. 4A will be obtained and stored in the original image recording unit 91.

The original image obtained in the process at step S2 and the composite background image obtained in the process at step S1 are not specifically limited in sort.

For example, any of the following data: pickup image data from the image pickup unit 11; image data, which is sent from an external device (not shown) and received by the communication unit 43; and image data, which is read from the removable recording medium 51 by the driver unit 44, may be obtained by the image obtaining unit 61 as data of the original image or data of the composite background image.

The initial alpha map creating unit 71 creates alpha map data based on the original image data and stores the created data in the alpha map recording unit 92.

So as to separate the alpha map data which has not been subjected to an adaptive filtering process by the adaptive filtering unit 72 from the alpha map data which has been subjected to the adaptive filtering process, the former alpha map data is called as an "initial alpha map data", which designation coincides with the description in FIG. 3.

Figure 4D:
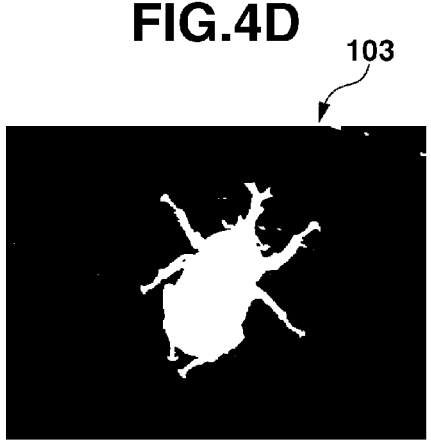
Figure 4C:
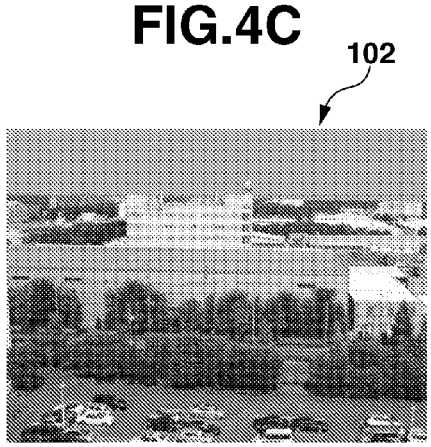

For example, an initial alpha map data 103 to be described later, as shown in FIG. 4D will be created and stored in the in the alpha map recording unit 92.

More specifically, a method of using data of a background image can be employed as the most simple method of creating binary data of the initial alpha map data. The background image is an original image with a subject of a composite foreground image (a beetle in FIG. 4A) removed. For example, the background image is an image 101 shown in FIG. 4B.

It should be noted that the background image is different from the composite background image. And further, it should be noted that, as will be described later, data of a background image is not data necessary for the combining process.

The initial alpha map creating unit 71 obtains binary data of a difference between the original image data stored in the original image recording unit 91 and the background image data to create initial alpha map.

The method of obtaining binary data of the initial alpha map is not limited to the above method, but a method of obtaining binary data of a pixel value of each coordinate of the original image can be used and other method will be also used. For example, the following method will be employed.

The initial alpha map creating unit 71 reads original image data from the original image recording unit 91 and extracts from the original image a region including a subject as an attention region. The subject contained in the original image is, for instance, the beetle in the initial alpha map 103 shown in FIG. 4D, and will be a foreground subject in the composite image to be described later.

The initial alpha map creating unit 71 creates binary image data including the attention region as a white region and a region other than the attention region as a black region, that is, the initial alpha map creating unit 71 creates data consisting of white pixel values "0" and black pixel values "1" as an initial alpha map data, and stores the created data in the alpha map recording unit 92.

The method of extracting the attention region is not limited to the above method, but any known method or any method, which will be developed may be employed.

The adaptive filtering unit 72 reads the initial alpha map data from the alpha map recording unit 92, and performs an adaptive filtering process on the initial alpha map data (step S4).

The adaptive filtering process is a process for applying a weighted-average filtering operation on data, wherein coefficients (hereinafter, referred to as a "filter coefficient") used in the weighted-average filter are adaptively changed with features of the original image.

Hereinafter, the initial alpha map data, which has been subjected to the adaptive filtering process is referred to as a "filtered alpha map data". The filtered alpha map data includes not only pixel values (alpha values) of "0" and/or "1" but also pixel values (alpha values) of a intermediate value between "0" and "1". In other words, in the filtered alpha map data, pixels of a pixel value (alpha value) "1" are contained in an region exactly defining the subject (foreground subject in the composite image), and the pixels of a pixel value (alpha value) "0" are exactly contained in the background area. Meanwhile, a pixel value (alpha value) of the pixels contained in an edge area takes a value between "0" and "1", or comes closer to "1" as an occupation of a component of the subject (foreground subject in the composite image) in the pixel increases.

The adaptive filtering unit 72 successively sets pixels composing the initial alpha map as a pixel to be process (hereinafter, an "attention pixel"), and successively performs the adaptive filtering process on the attention pixel.

More specifically, the filter coefficient calculating unit 81 calculates a filter coefficient ("attention-pixel filter coefficient") to be applied on the attention pixel of the initial alpha map. In this case, the filter coefficient calculating unit 81 calculates the filter coefficient using data (pixel value of corresponding pixel) of a pixel (hereinafter, "corresponding pixel") having the same coordinate as the attention pixel of the original image data stored in the original image recording unit 91.

The calculated attention-pixel filter coefficient is a coefficient to be applied only on the pixel set as the attention pixel. In other words, since the attention pixel is successively changed, a filter coefficient is successively calculated so as to vary adaptively with a feature of the corresponding pixel of the original image, on a pixel to pixel basis in the initial alpha map.

The filter coefficient recording unit 82 stores the attention-pixel filter coefficients successively calculated by the filter coefficient calculating unit 81. In other words, since the attention pixel is successively changed, the filter coefficient of each of the pixels composing the initial alpha map is stored in the filter coefficient recording unit 82.

Using the attention-pixel filter coefficients stored in the filter coefficient recording unit 82, the filter coefficient recording unit 82 applies a weighted-average filtering operation on data of a block (herein after, a "filter window") consisting of plural pixels including the attention pixel of the initial alpha map, thereby updating the pixel value (alpha values) of the attention pixel.

More specifically, a procedure is repeatedly performed, in which the pixels composing the initial alpha map are successively set as an attention pixel and the attention pixel is subjected to the process by the weighted-average filtering unit 83, whereby each of the pixel values (alpha values) of the initial alpha map is updated. As the result of the procedure, an aggregate of the updated pixel values (alpha values) is used as data of a filtered alpha map.

In other words, since the attention pixel is successively updated, the weighted-average filtering operation is applied on each of the pixels composing the initial alpha map, using the filter coefficient varying adaptively with a feature of the corresponding pixel of the original image.

The filtered alpha map data created in the process at step S4 is stored in the alpha map recording unit 92. Then, the composite foreground image creating unit 73 reads the filtered alpha map data from the alpha map recording unit 92 and the original image data from the original image recording unit 91. Then, the process advances to step S5.

The composite foreground image creating unit 73 uses data such as the original image data and data of the filtered alpha map to create and store data of a composite foreground image in the composite foreground image recording unit 93 (step S5).

When the data of a composite foreground image is created and stored in the composite foreground image recording unit 93 in the process at step S5, the composite background image creating unit 74 reads the data of a composite foreground image from the composite foreground image recording unit 93 and the data of a composite background image from the composite background image recording unit 94. Then, the process advances to step S6.

The composite background image creating unit 74 combines the data of a composite background image and the data of a composite foreground image in accordance with the filtered alpha map to create and store data of a composite image in the composite image recording unit 95 (step S6).

Then, the combining process finishes.

In the case of reproduction of the composite image, the composite image data stored in the composite image recording unit 95 is stored as display-image data in the display memory area of the memory 34 shown in FIG. 1. The output controlling unit 35 reads the display-image data from the memory 34, and displays an image represented by the display-image data, that is, a composite image on the displaying unit 41.

Now, the adaptive filtering process (step S4 in FIG. 3) by the adaptive filtering unit 72 will be described in detail.

FIG. 4A to FIG. 4D are views showing examples of image data used in the combining process performed in the present embodiment of the invention.

FIG. 4A is a view showing an example of data of the original image 100.

FIG. 4B is a view showing an example of data of an image 101 with a subject (beetle) removed, that is, an example of data of a background image 101 of the original image 100, wherein the subject is a foreground subject of the composite image.

FIG. 4C is a view showing an example of data of a composite background image 102.

FIG. 4D is a view showing an example of data of an initial alpha map 103. As shown in FIG. 4D, the data of an initial alpha map 103 is binary image data, in which a region (attention region) including the foreground subject (beetle) of the composite image is white and a region other than the attention region is black.

Figure 5:
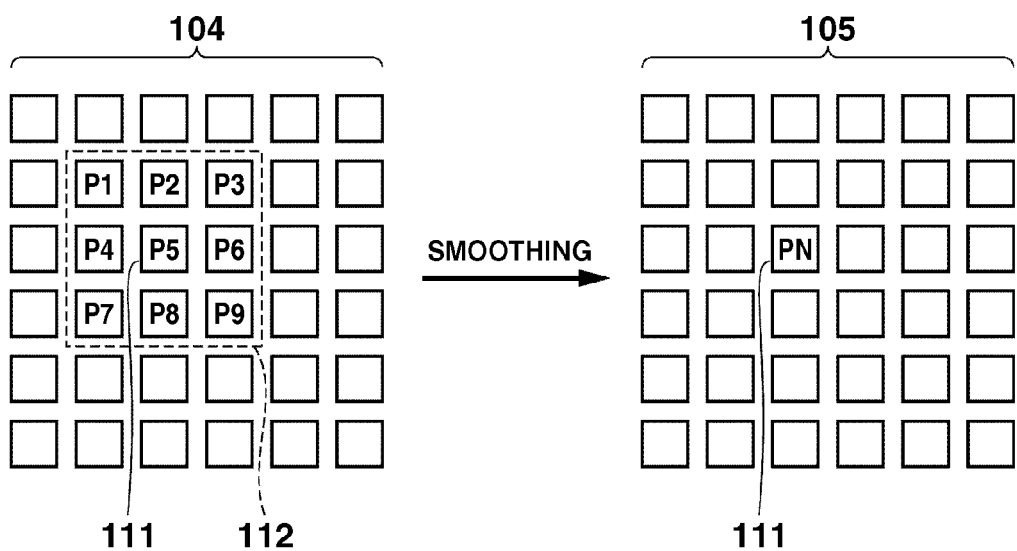
FIG. 5 is a view for schematically explaining a weighted-average filter employed by an adaptive filtering unit in the data processing unit shown in FIG. 2.

FIG. 5 is a view for schematically explaining a weighted-average filter employed by the adaptive filtering unit 72.

Image data 104 shown to the left side in FIG. 5 is data which has not yet been subjected to the weighted-average filtering operation and image data 105 shown to the right side in FIG. 5 is data which has been subjected to the weighted-average filtering operation. Hereinafter, the image 104 which has not yet been subjected to the weighted-average filtering operation is referred to as a "non-filtered image 104". The initial alpha map 103 shown in FIG. 4D is a non-filtered image 104 for the adaptive filtering unit 72 in FIG. 2.

Meanwhile, the image 105 which has been subjected to the weighted-average filtering operation is referred to as a "filtered image 105". The filtered alpha map is a filtered image 105 for the adaptive filtering unit 72 in FIG. 2.

An image, which consists of N pieces (N: an integer) of pixels in the horizontal direction and M pieces (M: an integer) of pixels in the vertical direction is denoted by a "N by M image". In the example shown in FIG. 5, one square denotes one pixel and a value within the square denotes a pixel value (in case of the initial alpha map, the pixel value is an alpha value).

In the example of FIG. 5, the same resolution of 6 by 6 image is employed in the non-filtered image 104 and the filtered image 105. The total number of the pixels of the image to be subjected to the weighted-average filtering operation is not limited to the example of FIG. 5 but the number of pixels can be arbitrary.

In the example of FIG. 5, a weighted-average filter of 3 by 3 is used and a pixel 111 having a pixel value P5 is set as the attention pixel. In this case, a block 112 of 3 by 3 containing the attention pixel 111 is set as a filter window, as shown in FIG. 5.

The data within the filter window 112 is subjected to the weighted-average filtering operation, whereby the pixel value P5 is converted into a pixel value PN at the attention pixel 111.

Figure 6:
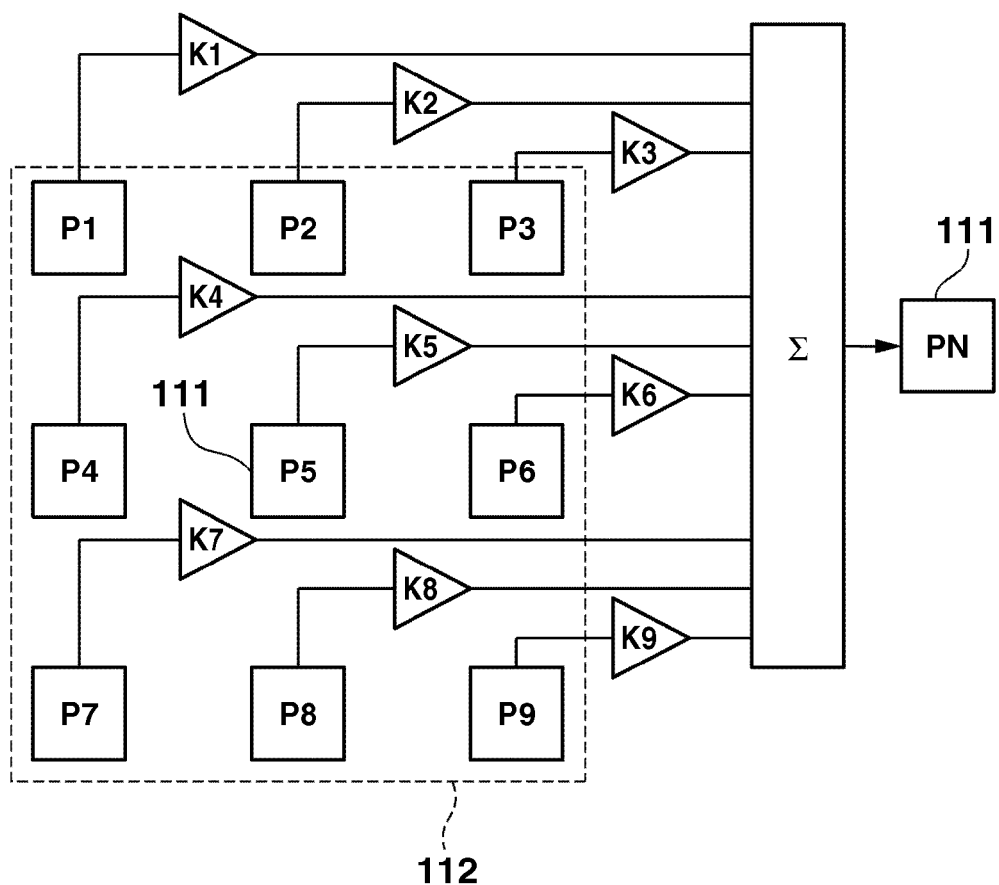
FIG. 6 is a view for explaining a method of calculating the weighted-average filter employed in the adaptive filtering unit in the data processing unit shown in FIG. 2.

FIG. 6 is a view for explaining a method of calculating the weighted-average filter employed in the adaptive filtering unit 72.

In FIG. 6, one square bearing a pixel value (in case of the initial alpha map, alpha value) represents one pixel. As an aggregate of these pixels, only the filter window 112 among the non-filtered image 104 shown in FIG. 5 is shown in FIG. 6. A triangle denotes a weighting unit, which gives certain weight on an input value, and a weighting value in the triangle indicates a filter coefficient.

In the weighted-average filter described above, filter coefficients K1 to K9 are set as the weighting values respectively for pixel values P1 to P9 in the filter window 112. A block Σ denotes an accumulating unit.

In the example shown in FIG. 6, the pixel values P1 to P9 in the filter window 112 are multiplied by the filter coefficients K1 to K9, respectively, and these resultant products are accumulated in the accumulating unit Σ, and the accumulated value will be an updated pixel value PN of the attention pixel 111. In other words, in the example shown in FIG. 5, the operation of the following formula (1) will be equivalent to application of the weighted-average filter on the filter window 112 including the attention pixel 111.

$$PN = K1 \times P1 + K2 \times P2 + \ldots + K5 \times P5 + \ldots K8 \times P8 + K9 \times P9. \quad (1)$$

In general terms, the operation of the following formula (2) will be equivalent to application of the weighted-average filter on the filter window including the attention pixel.

$$A'_p = \Sigma_{q \in \Omega} K_q \times A_q \quad (2)$$

In the formula (2), the coordinate of the attention pixel, that is, the coordinate of the center of the filter window is denoted by "p" and the coordinates of a neighborhood region Ω of the coordinate "p" are denoted by "q", wherein Ω is a region within the filter window. More specifically, the coordinate "q" denotes a coordinate of any one of the pixels within the filter window, including the coordinate "p" of the attention pixel. Aq denotes a pixel value at the coordinate "q" in the filter window (in case of the initial alpha map, an alpha value). For example, Ap will denote a pixel value of the attention pixel which has not yet been subjected to the weighted-average filtering operation. Meanwhile, Ap' in the right-hand side denotes a pixel value of the attention pixel which has been subjected to the weighted-average filtering operation (in case of the filtered alpha map, an alpha value). Kq denotes a filter coefficient of the pixel at the coordinate "q".

In a conventional technique, a constant value is used as the filter coefficient Kq. On the contrary, the filter coefficient Kq used in the weighted-average filtering unit 83 of the adaptive filtering unit 72 shown in FIG. 2 varies adaptively with a feature of the corresponding pixel in the original image on a pixel to pixel basis in the initial alpha map. In other words, the filter coefficient calculating unit 81 of the adaptive filtering unit 72 calculates the filter coefficient Kq, which adaptively varies in the above manner, on a pixel to pixel basis in the initial alpha map.

Figure 7:
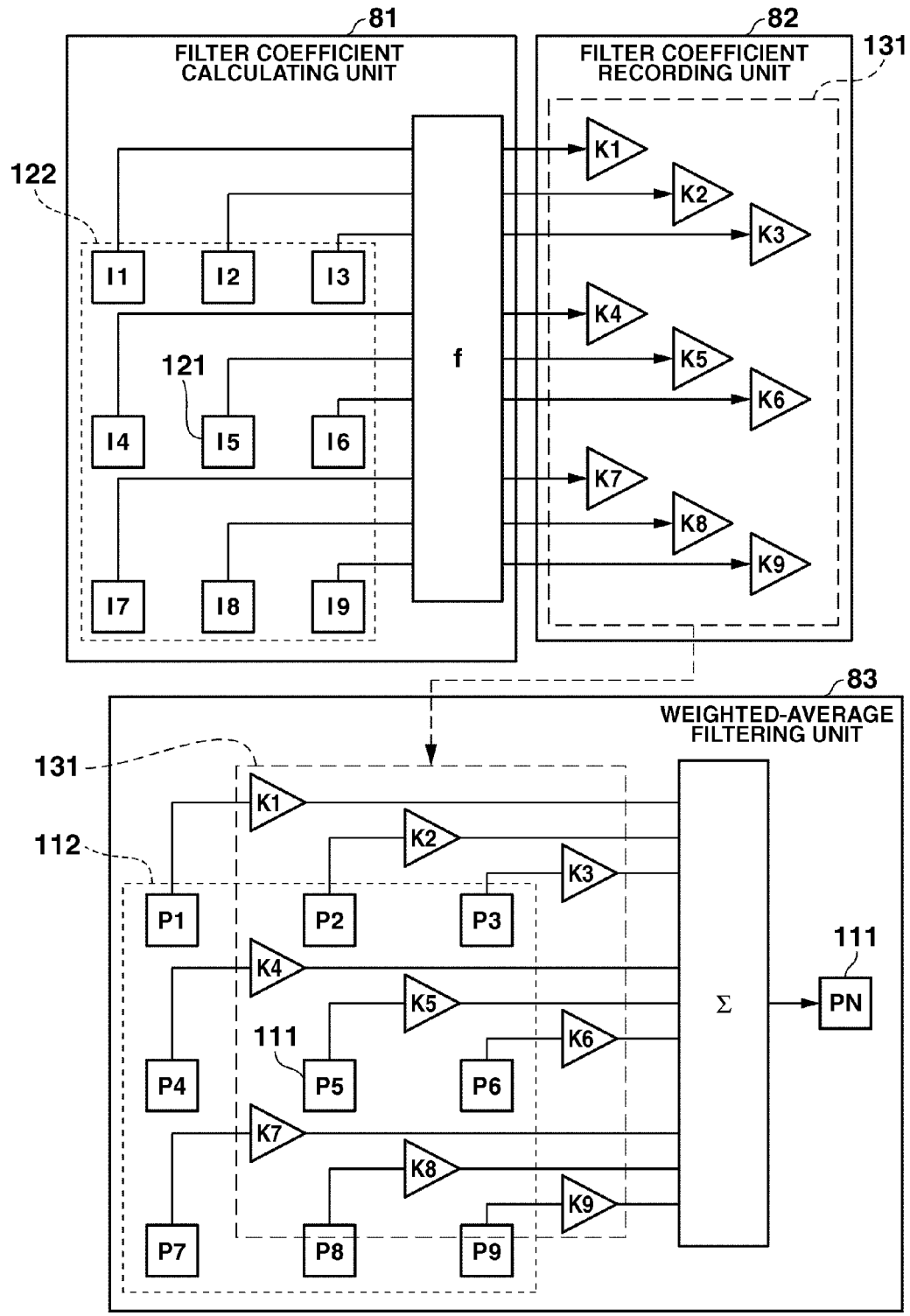
FIG. 7 is a view for specifically explaining the adaptive filtering process (step S4 in FIG. 3) performed by the adaptive filtering unit in the data processing unit shown in FIG. 2.

FIG. 7 is a view for specifically explaining the adaptive filtering process (step S4 in FIG. 3) performed by the adaptive filtering unit 72.

In FIG. 7, one square bearing a pixel value represents one pixel. As an aggregate of these pixels, a block 122 is indicated in the filter coefficient calculating unit 81. The block 122 is a 3 by 3 block, which includes a pixel 121 in the original image having the same coordinate as the attention pixel 111 of the initial alpha map, that is, the corresponding pixel 121 at the center. That is, the block 122 locates at a position in the original image, which position corresponds to the locating position of the filter window 112. Hereinafter, the block is referred to as a "block 122 corresponding to the original image".

A block bearing "f" is a calculating unit, which carries out an operation of a function "f", and is indicated in the filter coefficient calculating unit 81.

The filter coefficient calculating unit 81 carries out the operation of a function "f", using pixel values 11 to 19 in the block 122 corresponding to the original image as input values, thereby calculating the filter coefficients K1 to K9.

In the present embodiment, the block 122 corresponding to the original image, which contains at the center the pixel 121 in the original image having the same coordinate as the attention pixel 111 in the initial alpha map, that is, the corresponding pixel 121, is used to calculate the filter coefficients K1 to K9.

Since pixels composing the non-filtered image 104 shown in FIG. 5, that is, pixels composing the initial alpha map 103 shown in FIG. 4D are successively set as the attention pixel 111, the block 122 corresponding to the original image containing the corresponding pixel 121 at the center is successively converted. In other words, the pixel values 11 to 19 of the original image for calculating the filter coefficients K1 to K9 also vary on a pixel to pixel basis in the initial alpha map 103 shown in FIG. 5. Therefore, the filter coefficients K1 to K9 vary adaptively on a pixel to pixel basis in the initial alpha map 103 shown in FIG. 5.

Hereinafter, an aggregate of the filter coefficients used by the weighted-average filter such as the filter coefficients K1 to K9 is referred to as a "filter coefficient set". In the example shown in FIG. 7, separate filter coefficient sets 131 each consisting of the filter coefficients K1 to K9 are created on a pixel to pixel basis in the initial alpha map 103 by the filter coefficient calculating unit 81 and stored in the filter coefficient recording unit 82.

The example is shown in FIG. 7, in which one filter coefficient set 131 is stored in the filter coefficient recording unit 82, but in practice, separate filter coefficient sets 131 are stored in the filter coefficient recording unit 82 on a pixel to pixel basis in the initial alpha map 103 shown in FIG. 4D.

A diagram similar to the diagram shown in FIG. 6 is shown in the weighted-average filtering unit 83. That is, the weighted-average filtering unit 83 executes substantially the same process as the process described with reference to FIG. 5, thereby applying the weighted-average filtering operation on the filter window 112 containing the attention pixel 111. Then, the pixel value (alpha value) of the attention pixel 111 is converted from a value of P5 to a value of PN (after the filtering process has been executed on all the pixels).

The constant filter coefficients K1 to K9 are not used as in the conventional technique, but the separate filter coefficient set 131 is used, whose filter coefficients vary adaptively on a pixel to pixel basis in the initial alpha map 103 shown in FIG. 4D. Accordingly, the pixel value (alpha value) of the converted attention pixel 111 or the value of PN is more appropriate, when compared with the conventional technique using the constant filter coefficients K1 to K9.

The example shown in FIG. 7 is prepared in conformity with those in FIGS. 5 and 6 for purposes of better understanding of the embodiment of the invention and not for the purpose of limitation in the size of the filter window and the number of pixels.

The weighted-average filtering unit 83 uses the above formula (2) to calculate a pixel value (alpha value) of the converted attention pixel at the coordinate "p" or a value Ap'.

In this case, the filter coefficients Kq is not constant as in the conventional technique, and adaptively varies on a pixel to pixel basis in the initial alpha map 103 shown in FIG. 4D. Therefore, the converted pixel value (alpha value) of the attention pixel at the coordinate "p" or the calculated value Ap' is more appropriate, when compared with the conventional technique using the constant filter coefficient Kq.

The method of calculating the filter coefficient Kq at the coordinate "q" is not limited to any special method as far as such method is one using a pixel value Ip at the coordinate "p" in the original image (the same coordinate as the coordinate "p" of the attention pixel in the initial alpha map) and a pixel value Iq at the coordinate "q" in the original image (the same coordinate as the coordinate "q" of the attention pixel in the initial alpha map). But in consideration of the edge of the original image, it is appropriate to employ a method of carrying out an operation not so as to average pixels interleaving the edge between them to excess.

The pixels interleaving the edge between them mean two pixels, that is, one is a pixel (a corresponding pixel of the attention pixel in the initial alpha map) locating at a coordinate "p" within a first region and the other one is a pixel locating at a coordinate "q" within a second region, wherein the first region is, for example, an area of a subject to be a foreground object in the original image and the second region is, for example, an area corresponding to a background image in the original image and the edge exists between the first are and the second region.

The operation carried out not so as to average the pixels interleaving the edge between them to excess is an operation of decreasing a value of the filter coefficient Kq at the coordinate "q" to weaken an effect of the pixel value Iq at the coordinate "q" in the second region of the original image.

Using the above method, the weighted-average filtering operation can be applied on data of the initial alpha map such that the pixels interleaving the edge between them are not averaged excessively in consideration of the edge of the original image. In other words, using the method, an anti-alias effect is obtained with a sharp edge maintained, and a filtered alpha map is obtained, which is corrected for the edge of the original image in a consistent manner when compared with the initial alpha map. As a result, using such filtered alpha map, data can be obtained of a sharp composite image appealing no background of the original image.

In the present embodiment, in consideration of the edge of the original image, the following calculating method is employed as the method of calculating the filter coefficient Kq, which method will not average the pixels interleaving an edge between them excessively.

That is, the employed method calculates a difference between the pixel value Ip at the coordinate "p" in the original image and the pixel value Iq at the coordinate "q" in the original image and makes the filter coefficient Kq at the coordinate "q" larger as the difference is smaller. The coordinate "p" in the original image is equivalent to the central coordinate "p" of the filter window, that is, the same coordinate as the coordinate "p" of the attention pixel in the initial alpha map shown in FIG. 4D.

The above calculating method will be specifically described with reference to the present example, in which the edge exists between the first region (for example, the area of the subject of the foreground subject) and the second region (the area corresponding to the background image) and the coordinate "p" in the original image of the corresponding pixel of the attention pixel in the initial alpha map locates within the first region.

In the case where the coordinate "q" of a pixel, at which the filter coefficient Kq is to be calculated locates within the first region, since both the pixel value Ip at the coordinate "p" in the original image and the pixel value Iq at the coordinate "q" in the original image are pixel values in the first region, respectively, often these pixel values are near each other. Accordingly, in this case, the difference between the pixel value Ip at the coordinate "p" and the pixel value Iq at the coordinate "q" will be small, and the filter coefficient Kq at the coordinate "q" will be calculated to take a large value, thereby enhancing the effect of the pixel value Ip at the coordinate "p" in the original image.

Meanwhile, in the case where the coordinate "q" of a pixel, on which the filter coefficient Kq is to be calculated locates within the second region, since the pixel value Ip at the coordinate "p" in the original image is a pixel value in the first region and the pixel value Iq at the coordinate "q" in the original image is a pixel value in the second region, these pixel values are often separate from each other. Accordingly, in this case, the difference between the pixel value Ip at the coordinate "p" and the pixel value Iq at the coordinate "q" will be large, and the filter coefficient Kq at the coordinate "q" will be calculated so as to take a small value, thereby reducing the effect of the pixel value Ip at the coordinate "p" in the original image.

Even if the coordinate "q" of a pixel, on which the filter coefficient Kq is to be calculated locates within the second region, the difference between the pixel value Ip at the coordinate "p" and the pixel value Iq at the coordinate "q" can be small. This means that the pixels interleave the edge between them but have substantially the same value in brightness and substantially the same color. In this case, even if the filter coefficient Kq at the coordinate "q" should take a large value, no problem will occur.

More specifically, the first calculating method or the second calculating method of the filter coefficient Kq is used in the filter coefficient calculating unit 81 shown in FIG. 2.

The first calculating method of the filter coefficient Kq includes a series of executable processes, as follows:

The filter coefficient calculating unit 81 calculates a vector difference of Y component, Cb component, and Cr component, between the pixel value Ip at the coordinate "p" and the pixel value Iq at the coordinate "q" in the original image.

The filter coefficient calculating unit 81 executes an operation (hereinafter, "norm operation") of calculating a norm and/or a square norm for these vector components. In this case, the filter coefficient calculating unit 81 can execute the norm operation after giving weights to these vector components.

Then, the filter coefficient calculating unit 81 compares the outcome of the norm operation with a predetermined threshold value. If the outcome of the norm operation is larger than the threshold value, a provisional weight of "0" is given to the filter coefficient Kq. If the outcome of the norm operation is smaller than the threshold value, a provisional weight of "1" is given to the filter coefficient Kq.

The filter coefficient calculating unit 81 executes the series of processes on each pixel in the block corresponding to the original image, which corresponds to the filer window.

After executing the processes on all the pixels in the block corresponding to the original image, the filter coefficient calculating unit 81 gives the filter coefficient Kq at the coordinate "q" a quotient, which is obtained by dividing the provisional weight by the sum of the provisional weights in the block corresponding to the original image, such that the sum of the weights will be "1".

Meanwhile, with respect to the provisional weight of "0", the filter coefficient calculating unit 81 adds the corresponding value to a provisional weight of the central pixel (corresponding pixel of the attention pixel) at the coordinate "p" to make the sum of the weights constant, and can omit the final adaptive division.

The above operation follows the same concept as $\epsilon$-filter, and since $\epsilon$-filter is well known technology, the description thereof will be omitted.

Meanwhile, the second calculating method of the filter coefficient Kg includes a series of executable processes, as follows:

Using a framework of a joint (cross) bilateral filter, the above formula (2) can be converted into the following formula (3).

$$A_p' = (1/k_p)\Sigma_{q\in\Omega}g_d(p-q)g_r(|I_p-I_q|)\times A_q \quad (3)$$

In the formula (3), gd is Gauss Function relating to the space coordinates, and gr is Gauss Function relating to color components, and each Gauss Function has a Gauss Function parameter (variance of the normal distribution) and set to a predetermined value.

Gauss Function is expressed by the following formula (4), where a scalar-multiple number is neglected and $\sigma$ is a variance parameter.

$$g(d) = \exp\left(\frac{-d^2}{2\sigma^2}\right) \quad (4)$$

kp is expressed by the following formula (5).

$$k_p = \Sigma_{q\in\Omega}g_d(p-q)g_r(|I_p-I_q|) \quad (5)$$

Then, the filter coefficient Kq at the coordinate "q" will be expressed by the following formula (6). That is, the filter coefficient calculating unit 81 calculates the filter coefficient Kq at the coordinate "q" from the formula (6).

$$K_q = \frac{g_d(p-q)g_r(|I_p-I_q|)}{k_p} \quad (6)$$

In the formula (6), the filter coefficient Kq at the coordinate "q" also varies with a space distance between the coordinate "q" and the coordinate "p" of the central pixel (corresponding pixel of the attention pixel), and as the space distance is shorter, the filter coefficient Kq becomes larger, which is shown by features of an average Gaussian filter.

In this case, the weighted-average filtering unit 83 can calculate Ap' as the modified pixel value (alpha value) of the attention pixel at the coordinate "p" using the formula (3) in place of the formula (2).

In the above description, the adaptive filtering process performed by the adaptive filtering unit 72 has been described in detail. As described, the adaptive filtering process is performed by the adaptive filtering unit 72 at step S4 in FIG. 3, whereby data of the filtered alpha map is created and stored in the alpha map recording unit 92.

The composite foreground image creating unit 73 performs the following process at step S5 to create data of a composite foreground image. More specifically, assuming that data of a filtered alpha map is denoted by "A", data of an original image is denoted by "I" (the original image 100 in FIG. 4A), data of a background image is denoted by "B" (the background image 101 in FIG. 4B), and data of a composite foreground image is denoted by "F", then, the following formula (7) will be established.

$$I = F \times A + B \times (1-A) \quad (7)$$

If the data "B" of the background image is separately shot and known or can be estimated, such as the background image 101 shown in FIG. 4B, the data "F" of a composite foreground image can be estimated as given by the following formula (8) in the range where the data "A" of a filtered alpha map is larger than "0".

$$F = \frac{I - B \times (1-A)}{A} \quad (8)$$

That is, the composite foreground image creating unit 73 can create the data "F" of a composite foreground image from the formula (8). In the formula (7) and formula (8), signs such as "×", "+", "−", and "/" mean operations executed on a pixel to pixel basis, and "1" means that the pixel value of all the pixels is "1". In the case where the data "B" of a background image cannot be obtained, or cannot be properly estimated, the term "B" in the formula (8) can be simply replaced with "1". In this case, an effect can be obtained to some extent.

The composite background image creating unit 74 performs a process at step S6 in FIG. 3. More specifically, the composite background image creating unit 74 calculates the following formula (9), thereby creating data of a composite image.

$$Z = F \times A + N \times (1-A) \quad (9)$$

In the formula (9), "N" denotes data of a composite background image (the composite background image 102 in FIG. 4C) and "Z" denotes data of a composite image. It should be noted also in the formula (9) that the signs such as "X", "+", "−", and "/" mean operations executed on a pixel to pixel basis, and "1" means that the pixel value of all the pixels is "1".

As described above, the digital camera 1 according to the present embodiment of the invention is provided with the adaptive filtering unit 72.

The adaptive filtering unit 72 sets each of the pixels composing the initial alpha map as an attention pixel. Hereinafter, the coordinate of the attention pixel is referred to as an "attention coordinate p". In this case, the adaptive filtering unit 72 sets a range of plural coordinates including the attention coordinate "p" as a filter window, and applies the weighted-average filtering operation on data of the filter window, thereby converting the pixel value of the attention coordinate "p".

More specifically, the adaptive filtering unit 72 is provided with the filter coefficient calculating unit 81 and the weighted-average filtering unit 83.

The filter coefficient calculating unit 81 uses the pixel value Ip (pixel value Ip of the corresponding pixel) at a coordinate in the original image corresponding to the attention coordinate "p" in the filter window and the pixel value Iq at a coordinate in the original image corresponding to the coordinate "q" in the filter window to calculate the filter coefficient Kq at the coordinate "q" on a coordinate to coordinate basis in the filter window. In other words, a filter coefficient set is created on a coordinate to coordinate basis in the filter window.

The weighted-average filtering unit 83 uses the filter coefficient set to apply the weighted-average filtering operation on each pixel value in the filter window.

As described above, in consideration of the edge, the adaptive filtering unit 72 can apply the weighted-average filtering operation on data of the initial alpha map such that a smoothing effect does not extend over the edge to excess.

Using the above technique, an anti-alias effect can be realized with a sharp edge maintained, and a filtered alpha map is obtained, with the edge of the original image corrected in a consistent manner when compared with the initial alpha map. As the result of using the filtered alpha map, it is possible to provide a beautiful composite image having sharp edges with jaggies and effects of a mixed image tempered and with least background of the original image mixed in.

Further, the adaptive filtering process performed by the adaptive filtering unit 72 is a process, which is simple compared with a matching process, and requires no trial map. In other words, using data of the original image and data of the alpha map, it is possible to perform in a simple manner the combining process for cropping a subject out of the original image and combining the subject with the other image, thereby creating a more natural and viable composite image. The resultant effects will be clear, when views shown in FIGS. 8A to 8C, 9A to 9C, and 10A to 10C are compared.

Figure 8A:
FIG. 8A to FIG. 8C are views showing examples of resultant images obtained after the combining process is performed on data of an initial alpha map as-is.
Figure 8B:
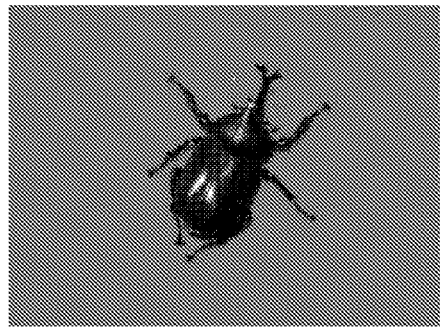
Figure 8C:

FIG. 8A to FIG. 8C are views showing examples of resultant images after the combining process is performed using data of the initial alpha map as-is.

FIG. 8A is a view showing an example of data of the initial alpha map (the same as the initial alpha map 103 in FIG. 104D) created from data of the original image 100 shown in FIG. 4A.

FIG. 8B is a view showing an example of data of a composite foreground image created from data of the initial alpha map shown in FIG. 8A.

FIG. 8C is a view showing an example of data of a composite image obtained by combining the data of a composite foreground image shown in FIG. 8B and the data of a composite background image 102 shown in FIG. 4C.

Figure 9A:
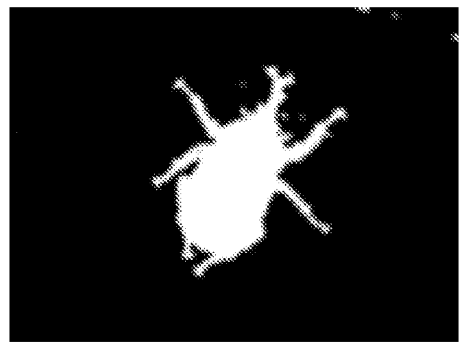
FIG. 9A to FIG. 9C are views showing examples of data of resultant composite images in the case of usage of alpha map data obtained after a conventional average filtering operation is applied on data of the initial alpha map.
Figure 9B:
Figure 9C:

FIG. 9A to FIG. 9C are views showing examples of data of resultant composite images in the case of usage of map data obtained after a conventional average filtering process is performed on data of the initial alpha map.

FIG. 9A is a view showing an example of data of a resultant alpha map obtained after the conventional average filtering operation is applied on data of the initial alpha map shown in FIG. 8A.

FIG. 9B is a view showing an example of data of a composite foreground image created from the data of an alpha map shown in FIG. 9A.

FIG. 9C is a view showing an example of data of a composite image obtained by combining the data of a composite foreground image shown in FIG. 9B and the data of a composite background image 102 shown in FIG. 4C.

FIG. 10A to FIG. 10C are views showing examples of data of resultant composite images in the case of usage of the filtered alpha map data obtained after the adaptive filtering process is performed by the adaptive filtering unit 72 in accordance with the formula (3).

FIG. 10A is a view showing an example of data of a resultant filtered alpha map obtained after the adaptive filtering process is performed on the data of an initial alpha map shown in FIG. 8A in accordance with the formula (3).

FIG. 10B is a view showing an example of data of a composite foreground image created from the data of a filtered alpha map shown in FIG. 10A.

FIG. 10C is a view showing an example of data of a composite image obtained by combining the data of a composite foreground image shown in FIG. 10B and the data of a composite background image 102 shown in FIG. 4C.

Although specific embodiments of the invention have been illustrated in the accompanying drawings and described in the foregoing detailed description, it will be understood that the invention is not limited to the particular embodiments described herein, but is capable of numerous rearrangements, modifications, and substitutions without departing from the scope of the invention.

For example, in the embodiments, the adaptive filtering unit 72 performs the adaptive filtering process in accordance with the formula (3). But if it is possible to vary in an adaptive manner the filter coefficient Kq at the coordinate "q" using the pixel value Ip at the coordinate "p" (coordinate "p" of the attention pixel in the initial alpha map) in the original image and the pixel value Iq at the coordinate "q" in the original image, the formula is not limited to the formula (3).

A particular example will be described, in which the adaptive filtering process is performed in accordance with the formula other than the formula (3).

For example, in the case where a component of the foreground object remains within the edge to much excess, a background component of the original image (a component of data "B" of the background image of the formula (7), formula (8) and formula (9)) can remain in data "F" of a composite foreground image or a resultant cropped foreground subject and/or data "Z" of a composite image, onto which a foreground object is pasted. In this case, data "Z" of an artificial composite image with a foreground object surrounded with a frame is produced, and even if a component of the region of the foreground object excessively remaining within the edge is minimal, such remaining component can be eye-catching for the user depending on difference from the composite background image "N".

On the contrary, when the component of the region of the foreground object is excessively removed from the range of the edge, in many cases such removed portion cannot be eye-catching for the user.

Using the above features, the adaptive filtering unit 72 can perform the adaptive filtering process in accordance with the following formula (10).

$$A'_p = (1/k_p)\{\Sigma_{q \in \Omega+} g_d(p-q) g_{r+}(|I_p - I_q|) A_q + \Sigma_{q \in \Omega-} g_d(p-q) g_{r-}(|I_p - I_q|) A_q\} \tag{10}$$

where kp is given by the following formula (11).

$$k_p = \Sigma_{q \in \Omega+} g_d(p-q) g_{r+}(|I_p - I_q|) + \Sigma_{q \in \Omega-} g_d(p-q) g_{r-}(|I_p - I_q|) \tag{11}$$

In the formula (10) and the formula (11), the neighborhood region Ω used in the formula (3) is divided into two aggregates: one is an aggregate Ω− of pixels of a pixel value (alpha value) of an input alpha map, which is less than 0.5 (in case of a two-value of 0 or 1, the pixel value is equivalent to 0) and the other is an aggregate Ω+ of pixels of a pixel value (alpha value) of an input alpha map, which is not less than 0.5 (in case of a two-value of 0 or 1, the pixel value is equivalent to 1).

In this case, as Gauss Function gr relating to color components, Gauss Function gr− to be applied to the aggregate Ω− and Gauss Function gr+ to be applied to the aggregate Q+ are separately prepared. For example, it is proper to prepare as Gauss Function gr− Q times Gauss Function gr+ (Q is a constant which is larger than 1) and in the same form as Gauss Function gr+, because a background component of a low pixel value (alpha value) of the initial alpha image is largely affected, making the edge thin.

Further, the adaptive filtering unit 72 can perform the adaptive filtering process in accordance with the following formula (12).

$$A'_p = C_p$$

$$\text{if } A_p \geq 0.5 \, C_p = (1/k_p) \Sigma_{q \in \Omega} g_d(p-q) g_{r+}(|I_p - I_q|) A_q$$

$$\text{if } A_p < 0.5 \, C_p = (1/k_p) \Sigma_{q \in \Omega} g_d(p-q) g_{r-}(|I_p - I_q|) A_q \quad (12)$$

The formula (12) means that when a pixel value (alpha value) of the attention pixel (central pixel of the filter window) in the initial alpha map is not less than 0.5, a function Cp in the second line is read, and when the pixel value (alpha value) of the attention pixel (central pixel of the filter window) in the initial alpha map is less than 0.5, a function Cp in the third line is read.

In this case, it is proper that the variance parameter of Gauss Function gr− belonging to the background is set less than the variance parameter of Gauss Function gr+ belonging to the foreground object, because the foreground object region is reduced since the smoothing process in the foreground object is effected a little beyond over the edge, and because the background hardly increases since the smoothing process in the foreground object is not effected relatively beyond the edge.

The adaptive filtering process, which is performed by the adaptive filtering unit 72 in accordance with the formula (10) and the formula (11) means that weights (filter coefficients) of the weighted-average filtering process are expanded asymmetrically in the background and in the foreground object (subject in the original image).

In this way, strongly reducing a mixed-in background component from the cropped region and suppressing the cropped region from to relatively increasing the background component mixed therein, the adaptive filtering unit 72 can create a composite image with least eye-catching original background mixed in. The cropped region is an area or region of the subject (foreground object of a composite image) cropped out of the background image. The mixed-in background means that the background of the original image is mixed in the cropped image. These effects will be clear if views shown in FIG. 11A to FIG. 11C are compared.

Figure 11A:
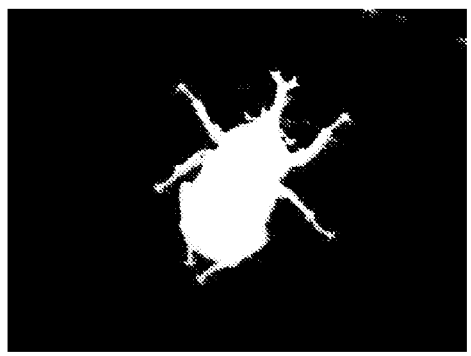
FIG. 11A to FIG. 11C are views showing examples of data of resultant composite images in the case of usage of the filtered alpha map data obtained after the adaptive filtering process is performed by the adaptive filtering unit in accordance with a formula (10).
Figure 11B:
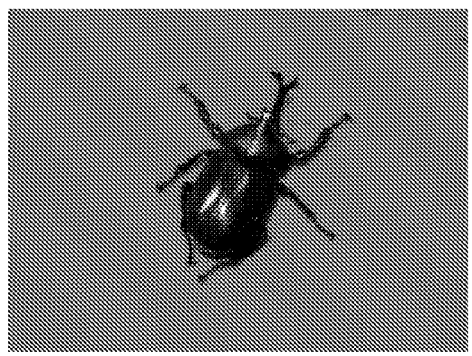
Figure 11C:

FIG. 11A to FIG. 11C are views showing examples of data of resultant composite images in the case of usage of the filtered alpha map data obtained after the adaptive filtering process is performed by the adaptive filtering unit 72 in accordance with the formula (10).

FIG. 11A is a view showing an example of data of a resultant filtered alpha map obtained after the adaptive filtering process is performed on the data of an initial alpha map shown in FIG. 8A in accordance with the formula (10).

FIG. 11B is a view showing an example of data of a composite foreground image created from the data of a filtered alpha map shown in FIG. 11A.

FIG. 11C is a view showing an example of data of a composite image obtained by combining the data of a composite foreground image shown in FIG. 11B and the data of a composite background image 102 shown in FIG. 4C.

In the above embodiment, the initial alpha map creating unit 71 creates data of a initial alpha map, which has the same size (and same resolution, herein after, referred to as the "original size") as the original image. The data size of the initial alpha map is not limited to the original size, but a decreased size (for example, half in horizontal and vertical size) may be used to reduce a work memory and calculation load. In this case, the adaptive filtering unit 72 performs the adaptive filtering process on the initial alpha map data having a decreased-size, and obtains the filtered alpha map of the original size from the resultant filtered alpha map of a decreased-size.

Meanwhile, it may be possible for the adaptive filtering unit 72 to obtain the initial alpha map having the original size from the data of an initial alpha map having a decreased-size, and then to perform the adaptive filtering process on data of the initial alpha map having the original size.

In this case, data of the initial alpha of a decreased-size map can be composed of not only pixel values of "0" and "1", but pixel values (alpha value) of an intermediate value between "0" and "1", but this gives no effect to the above procedure. When the adaptive filtering process is performed on data of the initial alpha map of a decreased-size by the adaptive filtering unit 72, the effect described with reference to FIGS. 8A to 8C, FIGS. 9A to 9C, FIGS. 10A to 10C, and FIGS. 11A to 11C are more prominent. These prominent effects will be more clear, when views shown in FIGS. 12A to 12C, and FIGS. 13A to 13C are compared.

Figure 12A:
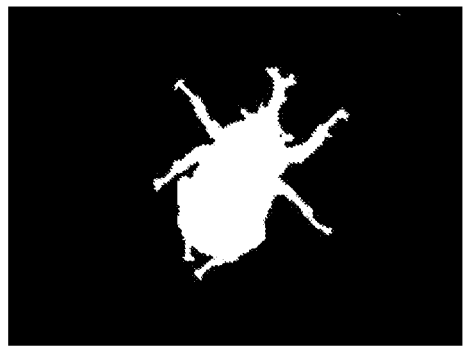
FIG. 12A to FIG. 12C are views showing examples of data of resultant composite images in the case of usage of alpha map data obtained after the conventional average filtering operation is performed on data of an initial alpha map of a decreased-size.
Figure 12B:
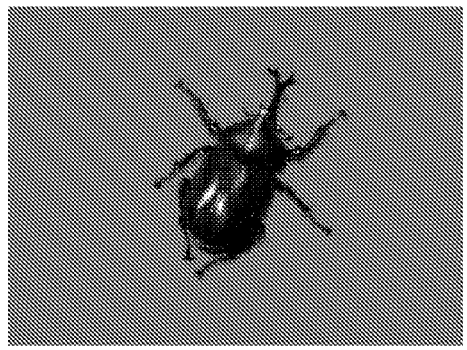
Figure 12C:

FIG. 12A to FIG. 12C are views showing examples of data of resultant composite images in the case of usage of alpha map data obtained after the conventional average filtering operation is applied on data of the initial alpha map having a decreased-size.

FIG. 12A is a view showing an example of data of an alpha map obtained after the conventional average filtering operation is applied on the data of an initial alpha map having the original size, which is obtained by scaling up the initial alpha map having a decreased-size, wherein the initial alpha map having a decreased-size is obtained by reducing the original image (shown in FIG. 8A to FIG. 8C) in size.

FIG. 12B is a view showing an example of data of a composite foreground image created from the alpha map data shown in FIG. 12A.

FIG. 12C is a view showing an example of data of a composite image obtained by combining the data of a composite foreground image shown in FIG. 12B and the data of a composite background image 102 shown in FIG. 4C.

Figure 13A:
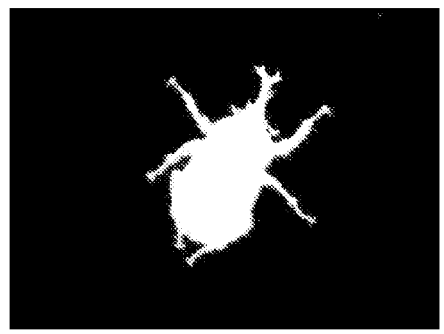
FIG. 13A to FIG. 13C are views showing examples of data of resultant composite images in the case of usage of filtered alpha map data obtained after the adaptive filtering process is performed on the data of an initial alpha map of a decreased-size by the adaptive filtering unit in accordance with the formula (10).
Figure 13B:
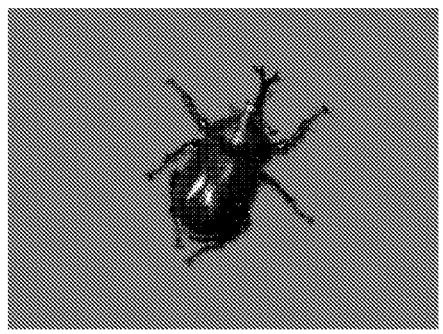
Figure 13C:

FIG. 13A to FIG. 13C are views showing examples of data of resultant composite images in the case of usage of filtered alpha map data obtained after the adaptive filtering process is performed on data of the initial alpha map of a decreased-size by the adaptive filtering unit 72 in accordance with the formula (10).

FIG. 13A is a view showing an example of data of a filtered alpha map obtained after the adaptive filtering process is performed in accordance with the above formula (10) on the data of an alpha map having the original size, which is obtained by scaling up the initial alpha map of a decreased-size, wherein the initial alpha map of a decreased-size is obtained by reducing the original image (shown in FIGS. 8A to 8C) in size.

FIG. 13B is a view showing an example of data of a composite foreground image created using the filtered alpha map data shown in FIG. 13A.

FIG. 13C is a view showing an example of data of a composite image obtained by combining the data of a composite foreground image shown in FIG. 12B and the data of a composite background image 102 shown in FIG. 4C.

In the above embodiment, the adaptive filtering unit 72 performs the adaptive filtering process on the initial alpha map data. Data to be subjected to the adaptive filtering process is not limited to the above initial alpha map data, but it will be possible to perform the adaptive filtering process on any data of an image, as far as such data is obtained after the original image has been subjected to some process.

The above embodiment has been described, in which the image processing apparatus, to which the present invention is to be applied is a digital camera, but the present invention can be applied to any other electronic equipment having the image processing function, other than the above described image processing apparatus. For instance, the present invention can be applied to a wide variety of apparatuses such as digital photo frames, personal computers, portable-type navigating apparatuses, and handheld game machines.

The series of processes described above can be realized in a hardware manner as well as in a software manner.

When the series of processes are performed in a software manner, a program composing the software is installed onto a computer from a network or a recording medium. The computer can be one mounted on specialized hardware. Further, the computer can be one that can execute various sorts of functions, when various sorts of programs are installed thereon, for instance, such as a general-purpose computer.

The recording medium storing these sorts of programs is composed of not only removable recording media (not shown), which are distributed separately from the image processing apparatus among the users to provide the programs, but also a recording medium previously mounted on the image processing apparatus to be supplied to the user. The removable recording media are composed of, for instance, magnetic disks (including floppy disk), optical disks, and/or magnet-optical disks. For instance, the optical disk is composed of CD-ROM (Compact Disk Read Only Memory) and DVD (Digital Versatile Disk). The magnet-optical disk is composed of MD (Mini Disk). The recording medium previously mounted on the image processing apparatus to be supplied to the user is composed of, for instance, ROM 32 storing the program, shown in FIG. 1 and a hard disk drive (not shown).

It is to be noted that the procedures of recording the program in the recording medium in the present description include the procedures executed in time-series in the order and also the procedures executed in parallel or separately.

Having described preferred embodiments of the invention, the invention is not limited to the particular embodiments described herein, and modifications and variations may be made to the disclosed embodiments while remaining within the scope of the invention as defined by the following claims.

What is claimed is:

1. An image processing apparatus comprising:
a data processing unit for converting data consisting of pixel values at coordinates in an original image into a two-valued value to create data of a processed image consisting of resultant pixel values at coordinates as data of an initial alpha map; and a filtering unit for setting each of the coordinates in the processed image created by the data processing unit as an attention coordinate to be processed, defining a region containing plural coordinates including the attention coordinate as a filter window, and performing a weighted-average filtering operation on data of the filter window, thereby converting the pixel value at the attention coordinate;
wherein the filtering unit comprises:
a filter coefficient calculating unit for using a first pixel value at a first coordinate in the original image, which first coordinate corresponds to the attention coordinate in the filter window, and a second pixel value at a second coordinate in the original image, which second coordinate corresponds to a certain coordinate in the filter window, to calculate a filter coefficient at the certain coordinate on a coordinate to coordinate basis in the filter window; and
a weighted-average filtering unit for using the filter coefficient of each coordinate in the filter window which is calculated by the filter coefficient calculating unit to apply the weighted-average filtering operation on the data of the filter window, and to create resultant data as data of a filtered alpha map.

2. The image processing apparatus according to claim 1, wherein the filter coefficient calculating unit calculates a difference between the first pixel value and the second pixel value in the original image and calculates the filter coefficient at the certain coordinate such that the filter coefficient increases as the calculated difference decreases.

3. The image processing apparatus according to claim 2, wherein the filter coefficient calculating unit:
calculates a vector difference of a Y component, a Cb component, and a Cr component as the difference between the first pixel value and the second pixel value in the original image;
executes a norm operation to calculate a norm or a norm square for the vector difference;
compares a result of the executed norm operation with a predetermined threshold value, and gives a provisional weight of "0" as the filter coefficient at the certain coordinate when the result of the executed norm operation is larger than the predetermined threshold value, and gives a provisional weight of "1" as the filter coefficient at the certain coordinate when the result of the executed norm operation is not larger than the predetermined threshold value; and
calculates the filter coefficient at the certain coordinate based on the provisional weight.

4. The image processing apparatus according to claim 2, wherein the filter coefficient calculating unit multiplies (i) an output value of a Gauss Function relating to a space coordinate with an input parameter of a difference between the first coordinate and the second coordinate in the original image by (ii) an output value of a Gauss Function relating to a color component with an input parameter of the difference between the first pixel value and the second pixel value in the original image, thereby obtaining a product, and calculates the filter coefficient at the certain coordinate based on the product.

5. The image processing apparatus according to claim 2, wherein the filter coefficient calculating unit calculates the filter coefficients such that the filter coefficients in a region of a subject of the original image and the filter coefficients in a region of a background of the original image in the data of the filter window become asymmetric.

6. The image processing apparatus according to claim 1, further comprising:

an image obtaining unit for obtaining image data including a subject as data of the original image, and obtaining data of an image, on which the subject is to be pasted as a foreground object, as data of a composite background image;

a composite foreground image creating unit for creating data of a composite foreground image including the subject from the data of the original image obtained by the image obtaining unit and the data of the filtered alpha map created by the weighted-average filtering unit; and a data combining unit for combining the data of the composite foreground image created by the composite foreground image creating unit with the data of the composite background image obtained by the image obtaining unit.

7. An image processing method in an image processing apparatus for processing data of an original image, the method comprising:

a processing step of converting data consisting of pixel values at coordinates in the original image into a two-valued value to create data of a processed image consisting of resultant pixel values at coordinates as data of an initial alpha map; and a filtering step of setting each of the coordinates in the processed image created at the processing step as an attention coordinate to be processed, defining a region containing plural coordinates including the attention coordinate as a filter window, and performing a weighted-average filtering operation on data of the filter window, thereby converting the pixel value at the attention coordinate;

wherein the filtering step comprises:

a filter coefficient calculating step of using a first pixel value at a first coordinate in the original image, which first coordinate corresponds to the attention coordinate in the filter window, and a second pixel value at a second coordinate in the original image, which second coordinate corresponds to a certain coordinate in the filter window, to calculate a filter coefficient at the certain coordinate on a coordinate to coordinate basis in the filter window; and a weighted-average filtering step of using the filter coefficient of each coordinate in the filter window which is calculated in the filter coefficient calculating step to apply the weighted-average filtering operation on the data of the filter window, and to create resultant data as data of a filtered alpha map.

8. A non-transitory computer readable recording medium mountable on an image processing apparatus for processing data of an original image, wherein the image processing apparatus is provided with a computer for controlling operations thereof, the recording medium storing a program which, when executed by the computer, controls the computer to perform functions comprising:

a data processing function of converting data consisting of pixel values at coordinates in an original image into a two-valued value to create data of a processed image consisting of resultant pixel values at coordinates as data of an initial alpha map; and a filtering function of setting each of the coordinates in the processed image created by the data processing function as an attention coordinate to be processed, defining a region containing plural coordinates including the attention coordinate as a filter window, and performing a weighted-average filtering operation on data of the filter window, thereby converting the pixel value at the attention coordinate;

wherein the filtering function comprises:

a filter coefficient calculating function of using a first pixel value at a first coordinate in the original image, which first coordinate corresponds to the attention coordinate in the filter window, and a second pixel value at a second coordinate in the original image, which second coordinate corresponds to a certain coordinate in the filter window, to calculate a filter coefficient at the certain coordinate on a coordinate to coordinate basis in the filter window; and a weighted-average filtering function of using the filter coefficient of each coordinate in the filter window which is calculated by the filter coefficient calculating function to apply the weighted-average filtering operation on data of the filter window, and to create resultant data as data of a filtered alpha map.

\* \* \* \* \*